United States Patent

Mizutani

(10) Patent No.: US 10,407,161 B2
(45) Date of Patent: Sep. 10, 2019

(54) INFORMATION TRANSMISSION SYSTEM, INFORMATION TRANSMISSION METHOD, AND AIRCRAFT

(71) Applicant: SUBARU CORPORATION, Tokyo (JP)

(72) Inventor: Takuma Mizutani, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/010,336

(22) Filed: Jun. 15, 2018

(65) Prior Publication Data

US 2019/0061917 A1    Feb. 28, 2019

(30) Foreign Application Priority Data

Aug. 24, 2017 (JP) .................. 2017-160885

(51) Int. Cl.
   *B64C 13/10*      (2006.01)
   *B64C 13/04*      (2006.01)
   *B64D 43/00*      (2006.01)
   *B64D 11/06*      (2006.01)
   *B64D 45/00*      (2006.01)

(52) U.S. Cl.
   CPC ............ *B64C 13/10* (2013.01); *B64C 13/044* (2018.01); *B64C 13/0421* (2018.01); *B64D 11/0689* (2013.01); *B64D 43/00* (2013.01); *B64D 45/00* (2013.01)

(58) Field of Classification Search
   CPC ................................ B64C 13/18; B64D 43/00
   USPC ......................................................... 340/971
   See application file for complete search history.

(56) References Cited

U.S. PATENT DOCUMENTS

| 8,339,285 B2 | 12/2012 | Boren et al. | |
| 9,557,479 B2 | 1/2017 | Suntsova et al. | |
| 2003/0223602 A1* | 12/2003 | Eichler | H04S 3/004 381/309 |
| 2009/0306839 A1* | 12/2009 | Youngquist | G01K 7/021 701/14 |
| 2011/0228962 A1* | 9/2011 | Taylor | G10H 1/0008 381/322 |

(Continued)

FOREIGN PATENT DOCUMENTS

| JP | H07-172396 A | 7/1995 |
| JP | 09-259366 A | 10/1997 |

(Continued)

OTHER PUBLICATIONS

Japanese Office Action issued in corresponding Japanese Patent Application No. 2017-160885, dated Dec. 18, 2018.

*Primary Examiner* — Fabricio R Murillo Garcia
(74) *Attorney, Agent, or Firm* — McDermott Will & Emery LLP (57) ABSTRACT

According to one implementation, an information transmission system includes: a transmission information determination part, an output device; and at least one vibrating device. The transmission information determination part is adapted to determine transmission information to a pilot of an aircraft. The output device is adapted to transmit the transmission information to the pilot by a visual representation, voice, sound or a light. The at least one vibrating device is adapted to propagate a vibration to the pilot when the transmission information is transmitted to the pilot.

17 Claims, 5 Drawing Sheets

(56) References Cited

U.S. PATENT DOCUMENTS

| | | | | |
|---|---|---|---|---|
| 2013/0154319 A1* | 6/2013 | Nouvel | ................... | B64C 13/00 |
| | | | | 297/217.3 |
| 2013/0245860 A1 | 9/2013 | Cooper | | |
| 2013/0249262 A1* | 9/2013 | Herman | ................... | G08B 6/00 |
| | | | | 297/217.1 |
| 2015/0197329 A1* | 7/2015 | Fong | ....................... | B64C 13/18 |
| | | | | 701/11 |
| 2016/0347472 A1 | 12/2016 | Williams et al. | | |

FOREIGN PATENT DOCUMENTS

| | | |
|---|---|---|
| JP | 2002-008200 A | 1/2002 |
| JP | 2011-025922 A | 2/2011 |
| JP | 2013-193731 A | 9/2013 |
| JP | 2017-001386 A | 1/2017 |

* cited by examiner

| CATEGORY | EMERGENCY | CAUTION, | REPORT |
|---|---|---|---|
| CONTENT | INFORMATION REQUIRING INSTANT DECISION | INFORMATION REQUIRING DECISION | INFORMATION REQUIRING NO DECISION |
| OUTPUT DEVICE | DISPLAY SPEAKER LAMP | DISPLAY SPEAKER LAMP | DISPLAY |
| OUTPUT METHOD | MESSAGE VOICE WARNING SOUND WARNING LIGHT | MESSAGE VOICE WARNING FLASHING | MESSAGE |
| VIBRATION | WITH | WITH | WITHOUT |
| VIBRATION POSITION | THE WHOLE BODY CONTROL STICK | LOWER HALF OF BODY | — |
| AMPLITUDE | LARGE | SMALL | — |
| FREQUENCY | HIGH | LOW | — |
| DURATION TIME | LONG | SHORT | — |
| PRIORITY | HIGH | MIDDLE | LOW |

INFORMATION TRANSMISSION SYSTEM, INFORMATION TRANSMISSION METHOD, AND AIRCRAFT

CROSS REFERENCES TO RELATED APPLICATIONS

This application is based upon and claims the benefit of priority from Japanese Patent Application No. 2017-160885, filed on Aug. 24, 2017; the entire contents of which are incorporated herein by reference.

FIELD

Implementations described herein relate generally to an information transmission system, an information transmission method, and an aircraft.

BACKGROUND

Various information is transmitted to a pilot who boards an aircraft. A pilot has to make a judgment in an instant based on transmitted information, as needed, and has to operate an aircraft. Accordingly, in order to ease burden of a pilot, a system which displays a message on a display, and transmits information to the pilot by sounds or warning sounds is proposed (for example, refer to Japanese Patent Application Publication JP1995-172396 A, Japanese Patent Application Publication JP 2002-008200 A and Japanese Patent Application Publication JP 2013-193731 A).

A pilot who boards an aircraft sometimes has to not only control and operate the aircraft but simultaneously makes judgment depending on circumstance changing by the minute. Therefore, pilot workload is very high.

Accordingly, an object of the present invention is to lighten pilot work load in an aircraft.

SUMMARY OF THE INVENTION

In general, according to one implementation, an information transmission system includes: a transmission information determination part, an output device; and at least one vibrating device. The transmission information determination part is adapted to determine transmission information to a pilot of an aircraft. The output device is adapted to transmit the transmission information to the pilot by a visual representation, voice, sound or a light. The at least one vibrating device is adapted to propagate a vibration to the pilot when the transmission information is transmitted to the pilot.

Further, according to one implementation, an aircraft includes the above-mentioned information transmission system.

Further, according to one implementation, an information transmission method includes: determining transmission information to a pilot of an aircraft; transmitting the transmission information to the pilot by a visual representation, voice, sound or a light; and propagating a vibration to the pilot when the transmission information is transmitted to the pilot.

DETAILED DESCRIPTION

An information transmission system, an information transmission method, and an aircraft according to an implementation of the present invention are described with reference to accompanying drawings.

(Configuration and Function of Information Transmission System)

Figure 1:
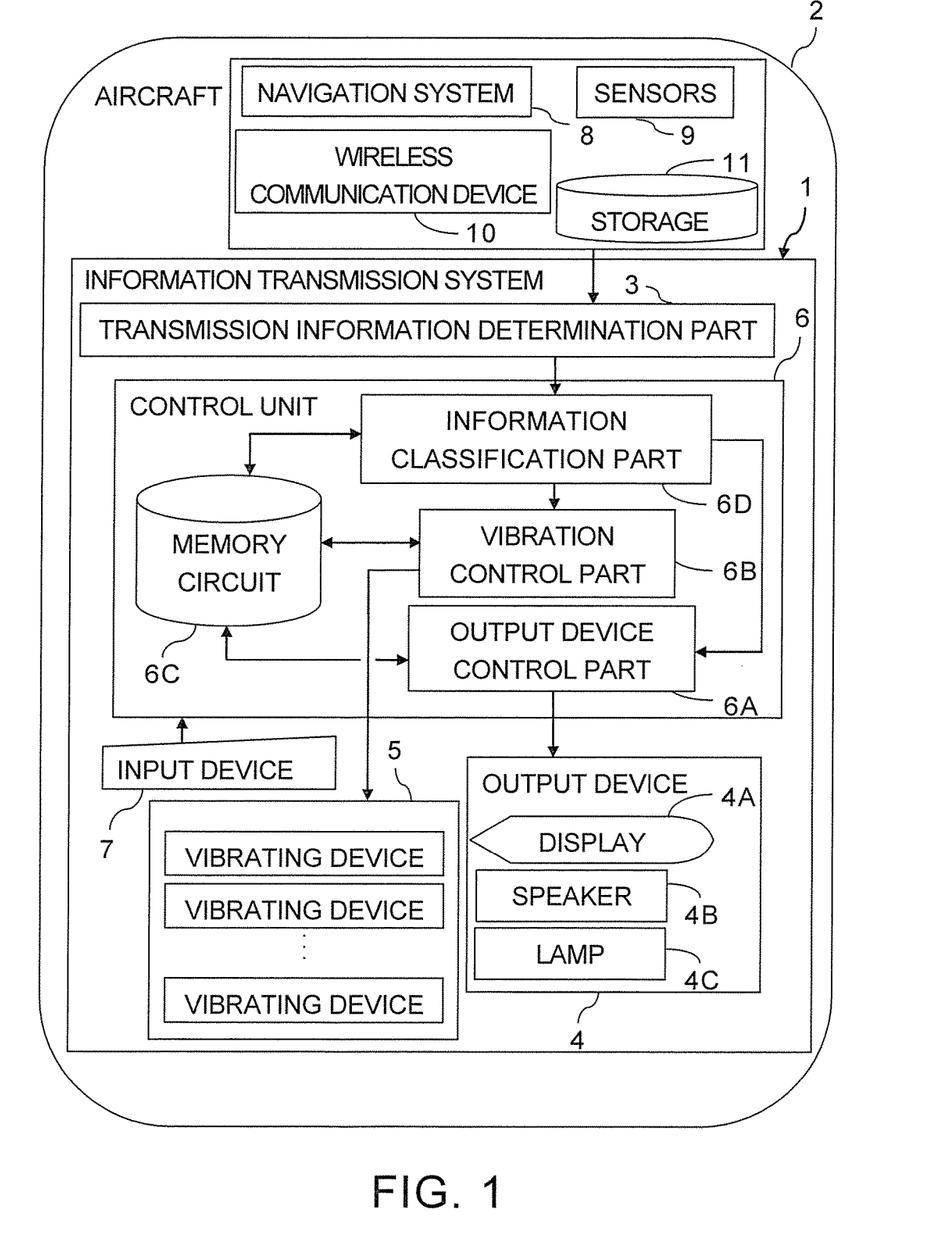
FIG. 1 is a configuration diagram of an information transmission system according to an implementation of the present invention.

FIG. 1 is a configuration diagram of an information transmission system according to an implementation of the present invention.

An information transmission system 1 is a system which transmits information to a pilot of an aircraft 2 with a vibration. Therefore, the information transmission system 1 is mounted in the aircraft 2. The aircraft 2 in which the information transmission system 1 is mounted may be any of a rotorcraft and a fixed wing aircraft.

The information transmission system 1 can be composed of a transmission information determination part 3, output devices 4, vibrating devices 5, control unit 6, and an input device 7.

The transmission information determination part 3 and the control unit 6 which compose the information transmission system 1 can be configured by electric circuitry. In a practical manner, portions of the transmission information determination part 3 and the control unit 6 each realizing a function by processing of digital signals or digital information can be configured by electronic circuitry, such as a computer into which program has been read. Meanwhile, portions each realizing a function by processing of analog signals can be configured by an electric circuit for analog electric signals. Therefore, an A/D (analog-to-digital) converter is disposed in the transmission information determination part 3 and the control unit 6 as needed. An optical signal circuit which consists of optical fibers and the like may be partially used instead of an electric circuit. In that case, a photoelectric converter is disposed between the optical signal circuit and an electric circuit.

The transmission information determination part 3 has functions to obtain information to be candidates of transmission information to a pilot of the aircraft 2 and to determine the transmission information to the pilot by extracting information according to flight situations of the aircraft 2 from the information to be the candidates of the transmission information.

The information which may be the transmission information to a pilot includes weather information, terrain information including positions of obstacles and the like, whether an obstacle is approaching or not, distances from other aircrafts, whether the present flight path deviates from a flight plan or not, the present flight speed and position, a distance and time to a destination, a remaining amount of a fuel, a cruising distance, and failure of equipment and instruments. As a matter of course, other various kinds of information which are necessary, important or useful for the flight can be candidates of the transmission information to a pilot.

Information, such as the present flight speed and position, a remaining amount of a fuel, a cruising distance, and failures of equipment and instruments can be acquired from a navigation system 8 and sensors 9 which are usually included in the aircraft 2. The navigation system 8 is a device which calculates a spatial position of the aircraft 2. A lot of the sensors 9 to detect physical quantities and failures of devices are disposed at parts of the aircraft 2. Therefore, the transmission information determination part 3 can be configured so that pieces of information can be obtained from the navigation system 8 and the sensors 9.

As a concrete example of the navigation system 8, an inertial navigation system, The GPS (Global Positioning System) navigation system and a Doppler radar navigation system are known. The inertial navigation system detects a spatial position and speed of a movable body to be mounted, using inertia measurement sensors, such as a gyroscope which detects change of an attitude and an accelerometer which detects change of speed. The GPS navigation system is a system which detects a spatial position of a movable body to be mounted, by receiving electric waves from the GPS satellites using a GPS receiver. A Doppler radar navigation system is a navigation system utilizing a phenomenon that a frequency of a reflected beam of radio wave discharged towards surface of the earth changes due to the Doppler effect. Not that, a navigation sensor, such as a radio altimeter, may be additionally used as a part of the navigation system 8.

Meanwhile, concrete examples of the sensors 9 includes Pitot tubes and thermometers for measuring a flight speed of the aircraft 2, rotation sensors for detecting attack angles of moving blades, strain sensors for detecting damages and pressure sensors attached on fuel tanks for detecting the residual quantity of fuel.

Moreover, ever-changing external information, such as weather information and positions of other aircrafts, which is to be acquired in the transmission information determination part 3 is acquirable from external sources of information through a wireless communication device 10 which is usually equipped with the aircraft 2. Therefore, the transmission information determination part 3 can be configured so that information can be obtained through the wireless communication device 10.

Meanwhile, pieces of information, such as terrain information, a flight plan, and coordinates of a destination, which do not change every second are acquirable from a storage 11 which is mounted in the aircraft 2 as a part of the control system. Therefore, the transmission information determination part 3 can be configured to search and obtain necessary information from the storage 11.

Furthermore, information depending on the present position of the aircraft 2, such as whether an obstacle is approaching or not, a distance to another aircraft, whether the present flight path deviates from a flight plan or not, and a distance and time to a destination, can be detected or judged automatically by the transmission information determination part 3, based on information obtained from external sources of information through the wireless communication device 10 or information obtained from the storage 11, and information obtained from the navigation system 8 or the sensors 9 in real time.

For example, a distance to another aircraft can be calculated based on positional information of the other aircraft obtained through the wireless communication device 10 and the present positional information of the aircraft 2 obtained from the navigation system 8. Meanwhile, information to notify that the present flight path has deviated from the flight plan, and a distance and time to a destination can be generated based on the flight path of the aircraft 2 and positional information of the destination of the aircraft 2, obtained from the storage 11, and the present positional information of the aircraft 2 obtained from the navigation system 8. Whether an obstacle is approaching or not can also be judged automatically based on positional information of the obstacle included in terrain information and the present positional information on the aircraft 2.

The transmission information determination part 3 can have filtering function which determines transmission information to a pilot by extracting a piece of information, according to a flight situation of the aircraft 2, out of pieces of information which are candidates of the transmission information to the pilot. As a concrete example, when terrain information on a broad area or an flight path has been stored in the storage 11, terrain information of a certain range from the present position of the aircraft 2, such as positional information of an obstacle which is close, can be extracted and determined to transmission information to a pilot. Similarly, when the present weather bulletin of a broad area or on a flight path has been given from the outside through the wireless communication device 10, weather bulletin within a certain range from the present position of the aircraft 2 can be extracted and determined to transmission information to a pilot.

By preparing such automatic filtering function of information in the transmission information determination part 3, a pilot of the aircraft 2 becomes possible to understand only necessary information more correctly and quickly without load. As a matter of course, an algorithm for desired automatic filtering can be created and a function can be added to the transmission information determination part 3.

Each output device 4 is an apparatus for transmitting transmission information to a pilot as a message using a text, a voice, a sound, or a light. When transmission information is transmitted as a visual representation of a message by, a display 4A is prepared. When transmission information is transmitted as a voice or a sound, such as a warning sound, which is not a voice, a speaker 4B is prepared. When a lamp 4C is prepared, information can be transmitted by lighting or flashing light.

Note that, as for the output devices 4, such as the display 4A, the speaker 4B, and the lamp 4C, it is practical to use the ones which are standard equipment in the aircraft 2 and the ones which a pilot usually uses. In particular, the speaker 4B has been attached to a helmet, which a pilot wears, in many cases. Moreover, a helmet to which the speaker 4B with a surround function is attached is also known. Accordingly, it is practical to use the speaker 4B, which is attached to a helmet, as the output device 4 for the information transmission system 1 to transmit information to a pilot.

Each vibrating device 5 propagates a vibration to a pilot when transmission information is transmitted to the pilot as a message, a voice, a sound, or a light. The vibrating devices 5 can be disposed at several different positions.

Figure 2:
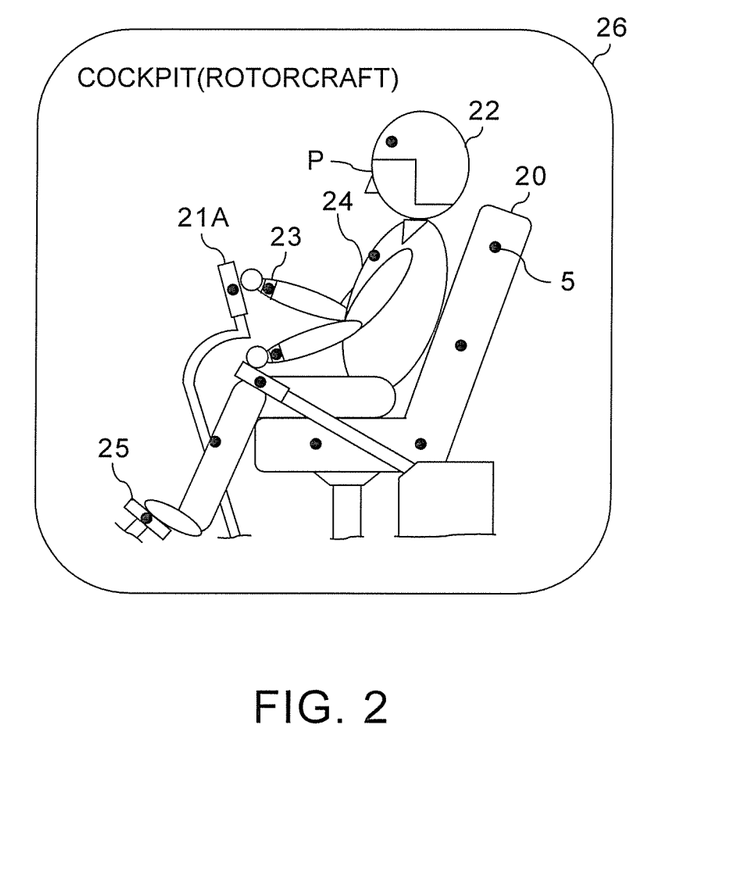
FIG. 2 shows an example of the vibrating devices disposed at different positions when the aircraft is a rotorcraft.

FIG. 2 shows an example of the vibrating devices 5 disposed at different positions when the aircraft 2 is a rotorcraft.

When the aircraft 2 is a rotorcraft, the vibrating device 5 can be attached to at least one of a seat 20 on which a pilot P sits down, a control stick 21A of the rotorcraft, a helmet 22 which the pilot P wears, a wristband 23 which is attached to the pilot P, a wear 24 of the pilot P and a pedal 25 of the rotorcraft, for example.

Since the range of the seat 20 which can transmit a vibration from the upper half of the body of the pilot P to a lower half of the body is wide, one or more vibrating devices 5 can be disposed in each of the upper part of the seat 20 to which the upper half of the body of the pilot P contacts and the lower part of the seat 20 to which the lower half of the body of the pilot P contacts. As for the wear 24 of the pilot P, one or more vibrating devices 5 can also be disposed in each of the upper half of body side and the lower half of body side.

Thus, the vibrating devices 5 can be attached to objects which normally exist in a cockpit 26 and objects which can be carried easily into the cockpit 26. Thereby, the vibrating devices 5 can be disposed without placing a large scale apparatus newly in the cockpit 26. In addition, the vibrating device 5 for exclusive use to propagate a vibration to the pilot P may be disposed depending on the structure of the cockpit 26.

Figure 3:
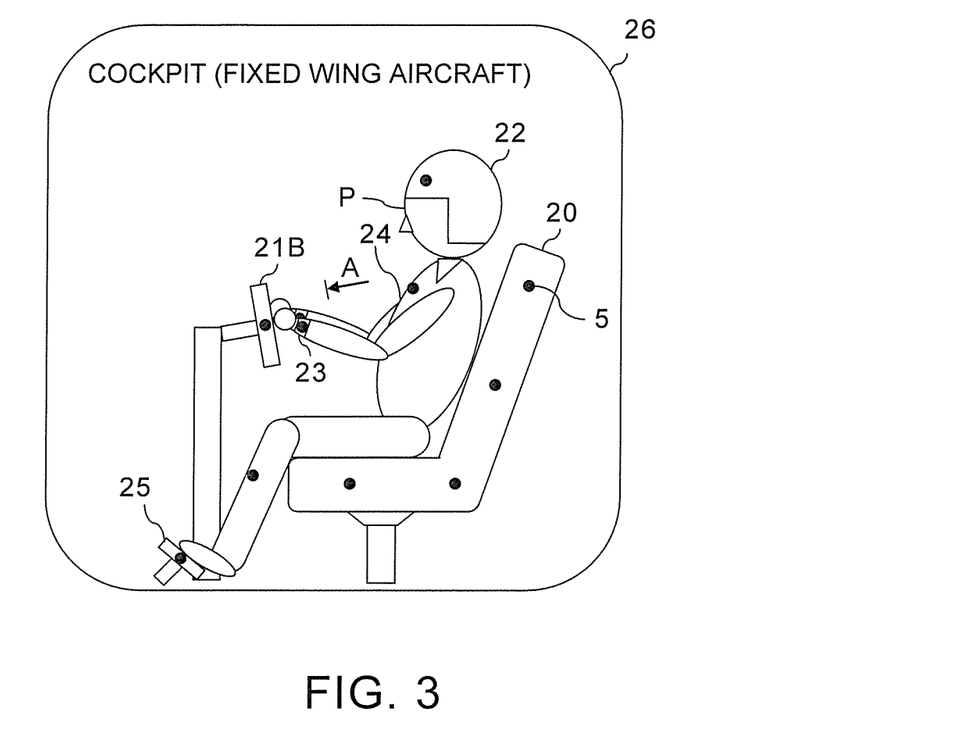
FIG. 3 shows an example of the vibrating devices disposed at different positions when the aircraft is a fixed wing aircraft.
Figure 4:
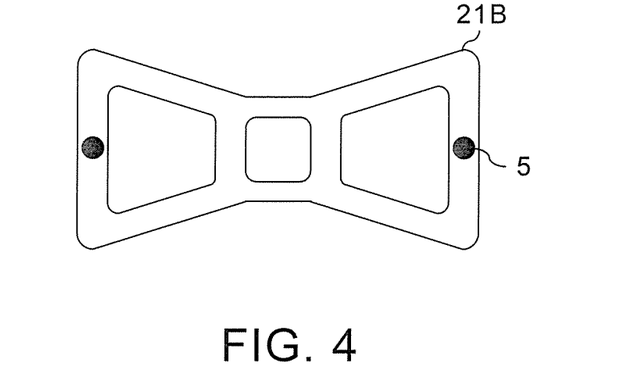
FIG. 4 is an arrow view of the control stick shown in FIG. 3 as viewed from A direction.

FIG. 3 shows an example of the vibrating devices 5 disposed at different positions when the aircraft 2 is a fixed wing aircraft, and FIG. 4 is an arrow view of the control stick 21B shown in FIG. 3 as viewed from A direction.

In the case where the aircraft 2 is a fixed wing aircraft, the vibrating device 5 can be attached to at least one of the seat 20 on which the pilot P sits down, the control stick 21B of the fixed wing aircraft, the helmet 22 which the pilot P wears, the wristband 23 which is attached to the pilot P, the wear 24 of the pilot P and the pedal 25 of the fixed wing aircraft, for example, as the case where the aircraft 2 is a rotorcraft. With regard to the seat 20 and the wear 24, one or more vibrating devices 5 can be disposed in each of the upper half of body side and the lower half of body side.

As the vibrating device 5 which is disposed in the cockpit 26A, a desired type of one can be used. As a kind of the vibrating device 5, an unbalance mass type, an oil pressure type and an electro-dynamic type are typical. The unbalance mass type is a type in which an eccentric weight is attached to a motor so that a vibration is generated by the centrifugal force of the weight when the motor with the weight is rotated. The oil pressure type is a type of generating a vibration by driving a piston with oil pressure. The electro-dynamic type is a type of generating a vibration utilizing the Lorentz force arisen by flowing current through a coil in a magnetic field. Therefore, it is realistic to adopt an unbalance mass type or an electro dynamic type of the vibrating device 5, which is small and does not require operation oil, in view of attaching the vibrating device 5 to an object which exists in the cockpit 26 of the aircraft 2.

The control unit 6 controls the output devices 4 and the vibrating devices 5 based on the transmission information to a pilot which has been obtained from the transmission information determination part 3. Specifically, the control unit 6 has an output device control part 6A which converts the transmission information which obtained from the transmission information determination part 3 into an output signal, such as an electric signal or an optical signal, and transmit the transmission information to a pilot by outputting the converted output signal to at least one of the output devices 4. Furthermore, the control unit 6 has a vibration control part 6B which propagates a vibration to the pilot by operating at least one of the vibrating devices 5 according to timing to output specific transmission information to at least one of the output devices 4 as an output signal. Note that, a user can freely set the time lag between the timing of starting an operation of at least one of the vibrating devices 5 and the timing of starting an output of the transmission information to at least one of the output devices 4.

The transmission information can be transmitted to a pilot as at least one of a message, a voice, a sound and a light from at least one of the display 4A, the speaker 4B, and the lamp 4C. Therefore, at least one of the display 4A, the speaker 4B, and the lamp 4C is to be selected by the output device control part 6A and an output signal is to be output to the selected at least one of the display 4A, the speaker 4B, and the lamp 4C from the output device control part 6A.

For example, when the transmission information is displayed on the display 4A as a message, an output signal expressing character codes and the like to display the message as a text is output to the display 4A. Meanwhile, when the transmission information is output from the speaker 4B as a voice or a sound, the transmission information is converted into an output signal expressing the voice or the sound to be output to the speaker 4B. When the transmission information is shown by lighting or light flashing of the lamp 4C, the transmission information is converted into a control signal of the lamp 4C to be output to the lamp 4C.

Thus, when a plurality of the output devices 4 which can output the transmission information are installed in or carried into the cockpit of the aircraft 2, it is necessary to specify at least one of the output devices 4 which is to be the output target of the transmission information.

Accordingly, transmission information can be classified into a plurality of categories. Then, which of a message, a voice, a sound, and a light is used for transmitting the transmission information can be determined for each category in advance. That is, a table where a plurality of categories to which pieces of transmission information belong are related to means for transmitting the pieces of transmission information which belong to the categories respectively can be prepared. The prepared table can be stored in a memory circuit 6C in the control unit 6.

The operating conditions of the vibrating device 5 or the vibrating devices 5, such as whether the vibrating device 5 should be operated or not and which position the vibration device 5 disposed at should be operated when a plurality of the vibrating devices 5 are disposed, can be also determined for each category in advance. Moreover, the vibrating conditions, such as an amplitude, a frequency and a duration time of a vibration may be changed according to each category. That is, the vibrating conditions, such as an amplitude, a frequency, and a duration time of vibration in addition to positions of the vibrating devices 5 which should be operated can be related with a plurality of categories, and stored as a table in the memory circuit 6C of the control unit 6.

Note that, when the aircraft 2 has a rotor like a rotorcraft or a fixed wing aircraft having a propeller, it is suitable to propagate each vibration from the vibrating device 5 to a pilot with a frequency different from a rotation frequency of the rotor, from a viewpoint of preventing the coupling.

Figure 5:
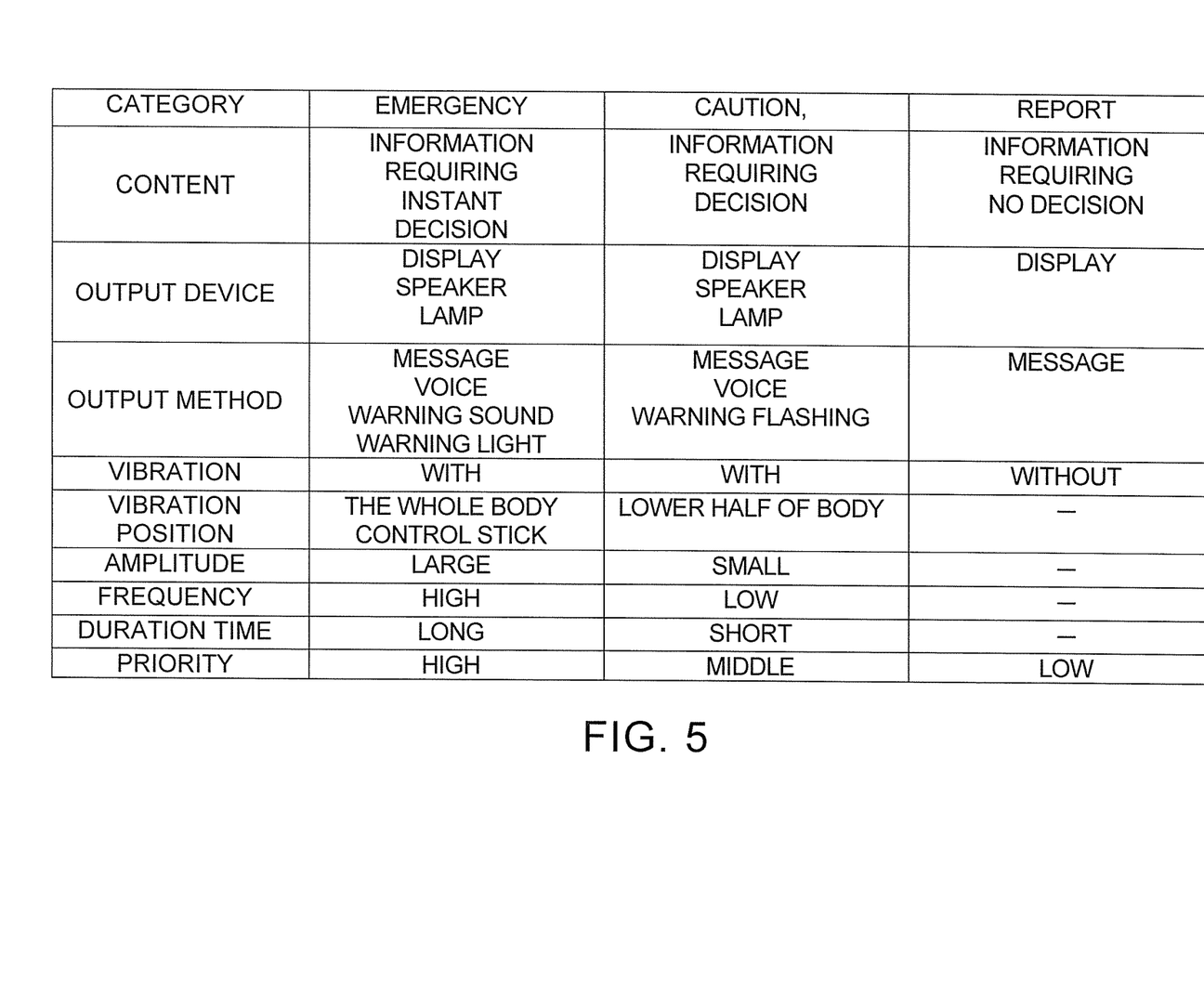
FIG. 5 shows an example of table in which the transmission information which should be given to a pilot is classified into three categories consisting of an emergency, a caution, and a report so that output conditions and vibrating conditions of the transmission information are defined for each category.

FIG. 5 shows an example of table in which the transmission information which should be given to a pilot is classified into three categories consisting of an emergency, a caution, and a report so that output conditions and vibrating conditions of the transmission information are defined for each category.

As shown in an example of FIG. 5, transmission information can be classified into three categories, consisting of an emergency, a caution, and a report, according to degrees of importance. Thus, transmission information which requires a pilot to make an instant judgment can be classified into the category of emergency, transmission information which does not requires a pilot to make an instant judgment but requires the pilot to make a judgment can be classified into the category of caution, transmission information which does not necessarily requires a pilot to make a judgment can be classified into the category of report respectively, for example.

Concrete examples of transmission information belonging to the category of emergency include information which notifies approach of an obstacle, information which notifies approach of another aircraft, information which notifies that remaining quantity of fuel is extremely little, information which notifies malfunction of an apparatus or instrument which influences the safety in the flight, and the like. Concrete examples of transmission information belonging to the category of caution include information which notifies that the present flight path has deviated from the flight plan, such as a case where an altitude is too low, positional information of an obstacle which may approach, positional information of another aircraft which may approach, and the like. Concrete examples of transmission information belonging to the category of report include a change of weather bulletin, the present flight speed and position, a distance and time to a destination, remaining quantity of fuel and a cruising distance, information which notifies arrival of a consort plane, and the like.

As a matter of course, it is also possible to define other categories and a user can set the number of categories. Moreover, a user can set to which categories respective pieces of transmission information belong as well.

Then, output conditions of transmission information belonging to each category and vibrating conditions of the vibrating devices 5 at the time of outputting transmission information belonging to each category can be defined as shown in FIG. 5.

Specifically, which of the display 4A, the speaker 4B, and the lamp 4C is used as the output device 4 for outputting transmission information belonging to each category and by which of a message, a voice, a sound, and a light, transmission information belonging to each category should be transmitted to a pilot can be defined as output conditions of the transmission information.

In addition, conditions, such as whether the vibrating device 5 should be vibrated or not, which position the vibrating device 5 disposed at should be vibrated, and an amplitude, frequency and duration time of a vibration can be defined as vibrating conditions of the vibrating device 5 or the vibrating devices 5 at the time of outputting transmission information belonging to each category.

As a concrete example, it is important to allow a pilot to recognize transmission information belonging to the category of emergency certainly and promptly. For that reason, transmission information belonging to the category of emergency can be transmitted to a pilot by a display of a message, reading of the message with a voice, generating of a warning sound, and a lighting of a warning light using the display 4A, the speaker 4B, and the lamp 4C, for example.

Furthermore, the vibrating devices 5 attached to the seat 20, the helmet 22, the wear 24, the pedal 25 and the like propagating vibrations, to the whole body including the upper half of the body, which are easy for a pilot to recognize immediately and the vibrating device 5 attached to the control stick 21A, 21B or the wristband 23, as exemplified in FIG. 2, FIG. 3, and FIG. 4, can be set to vibrate so that the pilot can recognize certainly that information on an emergency has been transmitted. Moreover, vibrating conditions of the vibrating devices 5 to be vibrated can be set so that each vibration can be propagated to a pilot with a relatively large amplitude, with a relatively high frequency, and for a relatively long duration time. Thereby, it becomes possible to transmit urgent contents to a pilot more certainly.

Meanwhile, transmission information belonging to the category of caution can be transmitted to a pilot using the display 4A, the speaker 4B, and the lamp 4C by a display of a message, reading of the message with a voice, and a flash of a warning light, for example.

In addition, at least one of the vibrating devices 5 attached to the pedal 25, the seat 20, the wear 24 and the like, as exemplified in FIG. 2, FIG. 3, and FIG. 4, which propagate vibrations to the lower half of the body of a pilot can be set to vibrate so that the pilot can recognize that information which corresponds to the caution is transmitted. Moreover, the vibrating conditions of the vibrating device 5 or the vibrating devices 5 to be vibrated can be set so that each vibration can be propagated to the pilot with a relatively small amplitude, with a relatively low frequency and for a relatively short duration time. Thereby, it becomes possible to give attention to the pilot effectively.

Meanwhile, transmission information belonging to the category of report can be transmitted to a pilot by a display of a message using only the display 4A, for example. On the other hand, it can be determined that any vibration is not generated so that the pilot can concentrate on an operation of the aircraft 2 and the like.

When a table where such output conditions of transmission information and vibrating conditions of the vibrating devices 5 are defined and a table where to which category each piece of transmission information would be belonged is defined are created and stored in the memory circuit 6C of the control unit 6, the control unit 6 becomes possible to automatically classify pieces of transmission information to a plot, obtained from the transmission information determination part 3, into a plurality of categories and automatically control the output devices 4 and the vibrating devices 5 under output conditions and vibrating conditions according to a category to which the transmission information belongs.

More specifically, classifying pieces of transmission information into the categories can be performed automatically in an information classification part 6D of the control unit 6. That is, when a piece of transmission information directed to a pilot is given from the transmission information determination part 3 to the information classification part 6D, the information classification part 6D can automatically specify a category, to which the piece of transmission information directed to the pilot belongs, by referring to the table, stored in the memory circuit 6C, where to which category each piece of transmission information would belong is defined.

Moreover, the output device control part 6A can control the output devices 4, such as the display 4A, the speaker 4B, the lamp 4C and the like, under output conditions according to a category specified in the information classification part 6D so that a piece of transmission information directed to a pilot can be transmitted to the pilot under the output conditions according to the category, i.e., by at least one of a display of a message, reading of the message in voice, generating of a sound, and lighting or flashing light.

Note that, when a piece of transmission information including an azimuth orientation is transmitted as a voice, the piece of transmission information can also be transmitted as a surround sound by outputting voice signals, for a surround voice according to the azimuth orientation, to the speaker 4B having a surround sound function. The function to generate voice signals for a surround voice according to contents of a piece of transmission information can also be included in the output device control part 6A.

Any surround voice is expressed by outputting voice signals, flowing through three or more channels, to the speaker 4B. In the standard, a surround voice is expressed using four channels of voice signals, which express voices from front, rear, right and left, or five channels of voice signals, which consist of the four channels of the voice signals and one channel of voice signal for expressing a voice in a low pitched sound region. Moreover, the speaker 4B which expresses a surround voice artificially using two channels of voice signals is also known.

Examples of information transmitted as a surround voice and a transmission method include informing a position of another aircraft or an obstacle, which is approaching, by generating and outputting voice signals for a surround voice so that a message may be read out with a voice from an azimuth orientation where the other aircraft or the obstacle exists.

The voice signals for a surround voice can be output to the speaker 4B, having a surround sound function, included in a helmet, for example. Such use of a surround voice makes it easy for a pilot to gasp an azimuth orientation of another aircraft and an obstacle.

Meanwhile, the vibration control part 6B can generate vibrations, under vibration conditions corresponding to a category specified in the information classification part 6D, by controlling the vibrating devices 5 under the vibration conditions according to the category.

For example, when it is a case where a plurality of the vibrating devices 5 are disposed at different positions, a vibration or vibrations can be generated at a position or positions corresponding to a category to which a piece of transmission information belongs, by controlling the vibrating device 5 or the vibrating devices 5 related to the category to which the piece of the transmission information belongs. Moreover, the vibrating device 5 or the vibrating devices 5 can be controlled so that a vibration or vibrations may be propagated with an amplitude, a frequency and a duration time related to the category to which the piece of the transmission information belongs.

Note that, when a plurality of pieces of information have been determined as pieces of transmission information to a pilot in a same period, the pieces of transmission information cannot be output simultaneously from the same output device 4. Moreover, even if it is not in a same period, a certain piece of information may be determined as a piece of transmission information to a pilot during outputting another piece of transmission information from the output device 4. In that case, the piece of transmission information which is determined subsequently cannot be output from the same output device 4 until the output of the piece of transmission information which has been started previously is completed.

However, each piece of transmission information has a degree of importance, and there is a case where even a piece of information latterly determined as a piece of transmission information should be transmitted to a pilot more preferentially than a piece of information previously determined as a piece of transmission information. For example, it is desirable that a piece of transmission information belonging to the category of emergency is preferentially transmitted to a pilot even when there is a piece of transmission information which belongs to the category of caution or report.

For that reason, the function to preferentially output a piece of transmission information, belonging to a category of which priority is higher, to at least one of the output devices 4 when a plurality of pieces of transmission information which are determined in the transmission information determination part 3 belong to different categories respectively can be provided in the output device control part 6A. Similarly, the function to control the vibrating devices 5 so that a vibration or vibrations under vibration conditions which should be generated with a transmission of a piece of transmission information belonging to a category of which priority is higher may be preferentially propagated to a pilot can be provided in the vibration control part 6B.

Thus, a priority can be assigned to each category. The priority assigned to each category can be stored as a table in the memory circuit 6C as exemplified in FIG. 5, similarly to output conditions of transmission information and vibration conditions.

Thereby, a piece of transmission information belonging to a category of which priority is higher can be transmitted to a pilot certainly even when a plurality of pieces of transmission information belonging to a plurality of categories, such as emergency, caution, and report, are determined to be output or even when a certain piece of transmission information with high priority is determined to be output while another piece of transmission information with low priority is output.

Such function to extract one piece of transmission information out of a plurality of pieces of transmission information determined as output targets can also be said to be one of filtering functions of information. Note that, the priority may also be set among pieces of transmission information belonging to a same category. To set priority among pieces of transmission information belonging to a same category is substantially same as to classify the pieces of transmission information into different subcategories.

The input device 7 is for inputting necessary information into the information transmission system 1. The input device 7 may be composed of switches and touch displays which are prepared in the cockpit of the aircraft 2 as standard equipment. Examples of information which is input into the information transmission system 1 include instruction to switch an operation of the information transmission system 1 from the on state to the off state besides instruction for changing the table in which output conditions of pieces of transmission information and vibrating conditions of the vibrating devices 5 are defined.

Since it is desirable to lessen manual operations by a pilot after the takeoff of the aircraft 2, it is appropriate that a boot of the information transmission system 1 is made to be performed automatically, interlocking with the control system of the aircraft 2. Specifically, the information transmission system 1 can be set to boot interlocking with switching the power supply of the control system of the aircraft 2 to the on state before the takeoff of the aircraft 2. In this case, the start trigger of the information processing in the information transmission system 1 is start up of the power supply of the control system of the aircraft 2.

On the other hand, the operation of the information transmission system 1 may become unnecessary, like in a case of flying the aircraft 2 for an aerial show or an exercise. For that reason, it leads to improvement in convenience that a pilot can manually switch the operation of the information transmission system 1 to off by operating the input device 7.

(Operation and Action)

Next, an information transmission method by the information transmission system 1 will be described.

Figure 6:
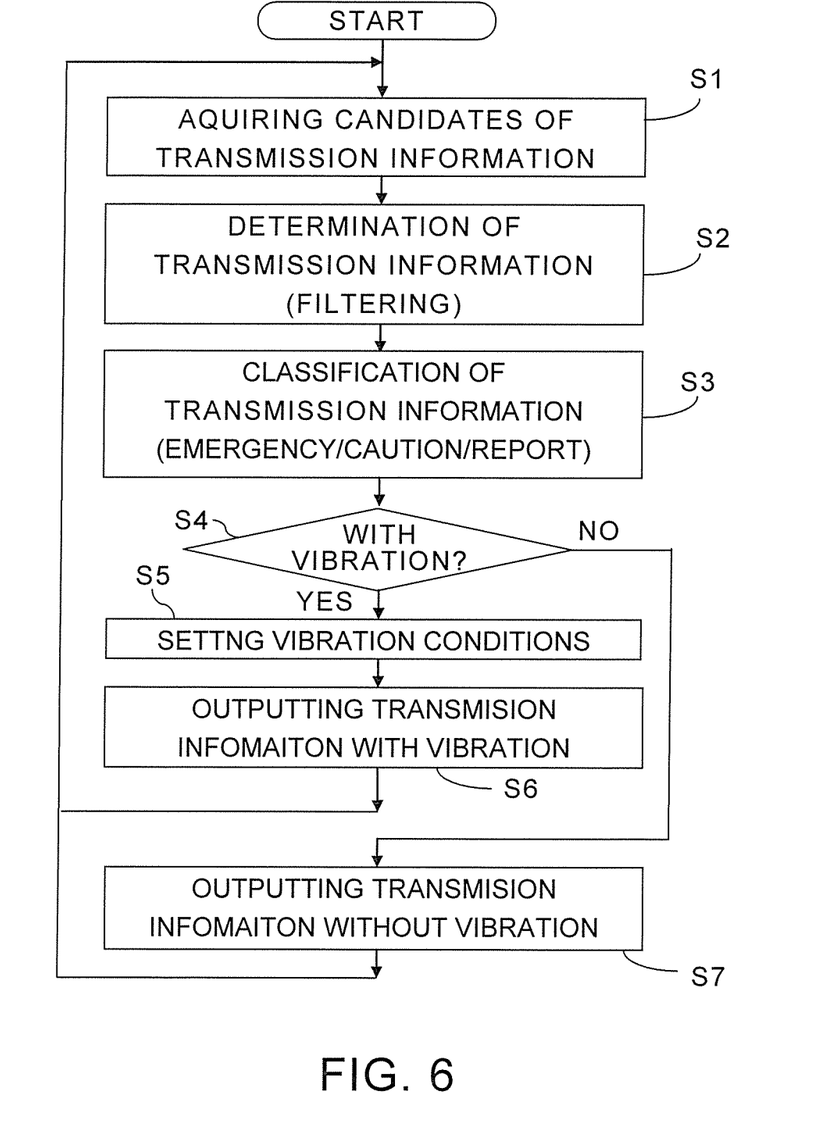
FIG. 6 is a flow chart which shows a flow for transmitting information to a pilot of the aircraft by the information transmission system shown in FIG. 1.

FIG. 6 is a flow chart which shows a flow for transmitting information to a pilot of the aircraft 2 by the information transmission system 1 shown in FIG. 1.

At first, in step S1, pieces of information to be candidates of pieces of transmission information are obtained in the transmission information determination part 3. Each piece of information to be a candidate of a piece of transmission information is acquirable from a desired information source, such as the navigation system 8, the sensors 9 and the storage 11 which are usually equipped with the aircraft 2. Alternatively, each piece of information to be a candidate of a piece of transmission information is also acquirable from an information source outside the aircraft 2 through the wireless communication device 10.

Next, in step S2, a piece of transmission information which should be transmitted to a pilot of the aircraft 2 is determined by the transmission information determination part 3. Specifically, the piece of information which should be the piece of transmission information to the pilot is extracted by filtering processing of the pieces of information which are the candidates of transmission information. The extracted piece of transmission information to the pilot is given from the transmission information determination part 3 to the control unit 6.

Then, in step S3, the piece of transmission information is classified into one of a plurality of categories in the information classification part 6D of the control unit 6. Specifically, the information classification part 6D automatically judges which of the categories, such as emergency, caution, and report, the piece of transmission information belongs to. The automatic judgment of one category can be performed by referring to a table, showing a relation between pieces of transmission information and the categories, which has been stored in the memory circuit 6C of the control unit 6.

Next, in step S4, the vibration control part 6B of the control unit 6 automatically judges whether a vibration or vibrations should be generated or not when the piece of transmission information is output to at least one of the output devices 4. More specifically, whether the category to which the piece of transmission information belongs is defined to output the piece of transmission information with generating a vibration or vibrations is determined by referring to a table, showing a relation between the categories and vibration conditions, which is stored in the memory circuit 6C of the control unit 6.

In the determination of step S4, when it has been determined that a vibration or vibrations should be generated, vibration conditions are set by the vibration control part 6B in step S5. The vibration conditions can also be set up automatically by referring to a table, showing a relation between the categories and the vibration conditions, stored in the memory circuit 6C. Specifically, a position where each vibration is generated in addition to an amplitude, a frequency, and a duration time of each vibration can be set according to the category.

Next, in step S6, the piece of transmission information is output from at least one of the output devices 4 with the vibration or the vibrations by operation of at least one of the vibrating devices 5. Specifically, the vibration control part 6B outputs a control signal or control signals to the specific vibrating device 5 or the specific vibrating devices 5 so that the vibration or the vibrations may be generated under the vibration conditions set according to the category to which the piece of transmission information belongs. Thereby, the specific vibrating device 5 or the specific vibrating devices 5 vibrate, and the vibration or the vibrations propagate to the pilot.

Meanwhile, the output device control part 6A of the control unit 6 automatically set up the output conditions according to the category to which the piece of transmission information belongs. The automatic setup of the output conditions can be performed by referring to a table, showing a relation between the categories and the output conditions, which has been stored in the memory circuit 6C. When the output conditions have been set up, an output signal or output signals are output from the output device control part 6A to the output device 4 or the output devices 4 according to the set output conditions.

Specifically, the output signal is output to at least one of the display 4A, the speaker 4B, and the lamp 4C. Thereby, the piece of transmission information is transmitted to the pilot by at least one of a display of a message, reading of the message by a voice, generating of a sound, and lighting or light flashing.

In this way, when the piece of transmission information is transmitted from at least one of the output devices 4 to the pilot, the vibration or the vibrations propagate from at least one of the vibrating devices 5 to the pilot. Accordingly, the pilot can easily grasp a degree of importance of the piece of transmission information, such as whether the piece of transmission information is of emergency or requires attention.

Meanwhile, in the determination of step S4, when it has been determined that no vibration should be generated, the piece of transmission information is output without vibrations in step S7. Specifically, the piece of transmission information is output to at least one of the output devices 4 without vibrations under the output conditions according to the category to which the piece of transmission information belongs. Accordingly, the pilot can recognize the piece of transmission information belongs to matters to be reported, for example, and therefore, is not of emergency, thereby the pilot can concentrate on operations.

Then, when an output of one piece of transmission information is completed, acquisition of candidates of transmission information in step S1 can be resumed again. Alternatively, candidates of transmission information may be obtained sequentially without waiting for the completion of an output of the previous piece of transmission information, and the next piece of transmission information may be output. When candidates of transmission information are obtained sequentially, filtering processing for preferentially outputting a piece of transmission information belonging to a category of which priority is high may also be performed in the control unit 6.

(Effects)

As described above, the information transmission system 1 and the information transmission method not only automatically determine a method of outputting information, but can generate at least one vibration when the information is transmit to a pilot from the aircraft 2.

Therefore, a pilot's work load can be reduced by the information transmission system 1 and the information transmission method. That is, information can be given to a pilot correctly and quickly without overloading the pilot.

Moreover, it makes possible for a pilot to easily recognize a degree of importance and a degree of urgency of information to be transmitted by changing vibration conditions according to the degree of importance and the degree of urgency of the information to be transmitted.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. An information transmission system in an aircraft, the system comprising:
   circuitry that classifies information to be transmitted to a pilot of the aircraft into a caution category or an emergency category;
   a pilot seat;
   first vibrating devices disposed on 1) a backrest of the pilot seat and 2) one of control stick of the aircraft and first wearable items on an upper body portion of the pilot; and
   second vibrating devices disposed on 1) a seat part of the pilot seat and 2) one of pedal of the aircraft and second wearable items on a lower body portion of the pilot,
   wherein the first vibrating devices transmit the information to the pilot by propagating a first vibration to the upper body portion of the pilot,
   wherein the second vibrating devices transmit the information to the pilot by propagating a second vibration to the lower body portion of the pilot,
   wherein when the circuitry classifies the information to be transmitted to the pilot into the caution category, the information is transmitted to the pilot only via the lower body portion of the pilot by propagating the second vibration from the second vibrating devices to the lower body portion of the pilot, and
   wherein when the circuitry classifies the information to be transmitted to the pilot into the emergency category, the information is transmitted to the pilot via an entire body of the pilot by propagating the first vibration from the first vibrating devices to the upper body portion of the pilot and the second vibration from the second vibrating devices to the lower body portion of the pilot.

2. The information transmission system according to claim 1,
   wherein when the circuitry classifies the information to be transmitted to the pilot into the emergency category, the first vibrating devices and the second vibrating devices propagate the first vibration and the second vibration for a first duration with a first amplitude pattern and a first frequency pattern, and
   wherein when the circuitry classifies the information to be transmitted to the pilot into the caution category, the second vibrating devices propagate the second vibration for a second duration with a second amplitude pattern and a second frequency pattern.

3. The information transmission system according to claim 2, wherein the first duration differs from the second duration,
   wherein the first amplitude pattern differs from the second amplitude pattern, and
   wherein the first frequency pattern differs from the second frequency pattern.

4. The information transmission system according to claim 3, further comprising:
   a first output device that transmits the information to the pilot by a visual presentation; and
   a second output device that transmits the information to the pilot by an audio presentation,
   wherein when the circuitry classifies the information to be transmitted to the pilot into the emergency category, the first output device and the second output device transmit the information to the pilot by the visual presentation and the audio presentation, respectively, according to a first pattern associated with the emergency category,
   wherein when the circuitry classifies the information to be transmitted to the pilot into the caution category, the first output device and the second output device transmit the information to the pilot by the visual presentation and the audio presentation, respectively, according to a second pattern associated with the caution category, and
   wherein the first pattern differs from the second pattern.

5. The information transmission system according to claim 4,
   wherein the audio presentation includes outputting a voice signal for a surround voice to a speaker having a surround voice function when the transmission information including an azimuth orientation is transmitted as a voice, the voice signal corresponding to the azimuth orientation.

6. The information transmission system according to claim 5,
   wherein the aircraft has a rotor, and
   wherein a vibration frequency of the first vibration of the first vibrating devices and a vibration frequency of the second vibration of the second vibrating devices are different from a rotation frequency of the rotor.

7. The information transmission system according to claim 4,
   wherein the aircraft has a rotor, and
   wherein a vibration frequency of the first vibration of the first vibrating devices and a vibration frequency of the second vibration of the second vibrating devices are different from a rotation frequency of the rotor.

8. The information transmission system according to claim 3,
   wherein the aircraft has a rotor, and
   wherein a vibration frequency of the first vibration of the first vibrating devices and a vibration frequency of the second vibration of the second vibrating devices are different from a rotation frequency of the rotor.

9. The information transmission system according to claim 2, further comprising:
   a first output device that transmits the information to the pilot by a visual presentation; and
   a second output device that transmits the information to the pilot by an audio presentation,
   wherein when the circuitry classifies the information to be transmitted to the pilot into the emergency category, the first output device and the second output device transmit the information to the pilot by the visual presentation and the audio presentation, respectively, according to a first pattern associated with the emergency category,
   wherein when the circuitry classifies the information to be transmitted to the pilot into the caution category, the first output device and the second output device transmit the information to the pilot by the visual presentation and the audio presentation, respectively, according to a second pattern associated with the caution category, and wherein the first pattern differs from the second pattern.

10. The information transmission system according to claim 9, wherein the aircraft has a rotor, and wherein a vibration frequency of the first vibration of the first vibrating devices and a vibration frequency of the second vibration of the second vibrating devices are different from a rotation frequency of the rotor.

11. The information transmission system according to claim 2, wherein the aircraft has a rotor, and wherein a vibration frequency of the first vibration of the first vibrating devices and a vibration frequency of the second vibration of the second vibrating devices are different from a rotation frequency of the rotor.

12. The information transmission system according to claim 1, further comprising:

a first output device that transmits the information to the pilot by a visual presentation; and a second output device that transmits the information to the pilot by an audio presentation, wherein when the circuitry classifies the information to be transmitted to the pilot into the emergency category, the first output device and the second output device transmit the information to the pilot by the visual presentation and the audio presentation, respectively, according to a first pattern associated with the emergency category, wherein when the circuitry classifies the information to be transmitted to the pilot into the caution category, the first output device and the second output device transmit the information to the pilot by the visual presentation and the audio presentation, respectively, according to a second pattern associated with the caution category, and wherein the first pattern differs from the second pattern.

13. The information transmission system according to claim 12, wherein the aircraft has a rotor, and wherein a vibration frequency of the first vibration of the first vibrating devices and a vibration frequency of the second vibration of the second vibrating devices are different from a rotation frequency of the rotor.

14. The information transmission system according to claim 1, wherein the aircraft has a rotor, and wherein a vibration frequency of the first vibration of the first vibrating devices and a vibration frequency of the second vibration of the second vibrating devices are different from a rotation frequency of the rotor.

15. An information transmission method comprising:

classifying information to be transmitted to a pilot of the aircraft into a caution category or an emergency category;

when the information to be transmitted to the pilot is classified into the emergency category, transmitting the information to the pilot via an entire body of the pilot by propagating a first vibration from a first vibrating devices to an upper body portion of the pilot and a second vibration from a second vibrating devices to the lower body portion of the pilot; and when the information to be transmitted to the pilot is classified into the caution category, transmitting the information to the pilot only via the lower body portion of the pilot by propagating the second vibration from the second vibrating devices to the lower body portion of the pilot, wherein the first vibrating devices disposed on 1) a backrest of a pilot seat and 2) one of control stick of the aircraft and first wearable items on the upper body portion of the pilot, and wherein the second vibrating devices disposed on 1) a seat part of the pilot seat and 2) one of pedal of the aircraft and second wearable items on the lower body portion of the pilot.

16. The information transmission method according to claim 15, wherein when the information to be transmitted to the pilot is classified into the emergency category, the first vibrating devices and the second vibrating devices propagate the first vibration and the second vibration for a first duration with a first amplitude pattern and a first frequency pattern, and wherein when the information to be transmitted to the pilot is classified into the caution category, the second vibrating devices propagate the second vibration for a second duration with a second amplitude pattern and a second frequency pattern.

17. The information transmission method according to claim 16, wherein the first duration differs from the second duration, wherein the first amplitude pattern differs from the second amplitude pattern, and wherein the first frequency pattern differs from the second frequency pattern.

* * * * *